United States Patent [19]

Mochida

[11] Patent Number: 5,472,464

[45] Date of Patent: Dec. 5, 1995

[54] AIR CLEANER FOR ENGINES

[75] Inventor: Kazuomi Mochida, Tokyo, Japan

[73] Assignee: Going Tokyo Co., Ltd., Tokyo, Japan

[21] Appl. No.: 260,810

[22] Filed: Jun. 16, 1994

[30] Foreign Application Priority Data

Dec. 27, 1993 [JP] Japan .................................. 5-074177 U
Feb. 10, 1994 [JP] Japan .................................. 6-001683 U

[51] Int. Cl.$^6$ .......................... B01D 29/01; B01D 35/02
[52] U.S. Cl. ...................... 55/385.3; 55/496; 55/502; 55/503; 55/510; 55/511; 55/521; 123/198 E
[58] Field of Search .................... 55/385.3, 475, 55/495–497, 502, 503, 510, 511, 521; 123/198 E

[56] References Cited

U.S. PATENT DOCUMENTS

| | | | |
|---|---|---|---|
| 3,552,103 | 1/1971 | Smith | 55/502 X |
| 3,707,832 | 1/1973 | Muller et al. | 55/503 X |
| 4,175,936 | 11/1979 | Lough et al. | 55/502 X |
| 4,725,296 | 2/1988 | Kurotobi | 55/497 |
| 4,861,359 | 8/1989 | Tettman | 55/502 X |
| 4,961,762 | 10/1990 | Howeth | 55/497 X |
| 4,995,891 | 2/1991 | Jaynes | 55/497 X |
| 5,120,334 | 6/1992 | Cooper | 55/497 X |
| 5,178,760 | 1/1993 | Solberg, Jr. | 55/511 X |
| 5,213,596 | 5/1993 | Kume et al. | 55/502 X |
| 5,332,409 | 7/1994 | Dralle | 55/502 X |

FOREIGN PATENT DOCUMENTS 63-302915  12/1988  Japan .................................. 55/497

Primary Examiner—Robert Spitzer
Attorney, Agent, or Firm—Rogers & Killeen

[57] ABSTRACT

A method and apparatus for increasing the internal height of a casing of an air cleaner for an engine in order to accommodate a larger air filter. A larger air filter is accommodated by increasing the distance between the upper and lower members of the casing by increasing the thickness of the air filter's peripheral flange or by adding a spacer element between the upper and lower members.

8 Claims, 2 Drawing Sheets

AIR CLEANER FOR ENGINES

BACKGROUND OF THE INVENTION

1. Field of the Invention

The present invention relates to an air cleaner mainly used for automobile engines.

2. Description of the Related Art

In many cases, air cleaners having a uniform shape and structure are generally used to certain models of automobiles of a plurality of the models thereof manufactured by respective manufactures. This is carried out to promote the reduction of a manufacturing cost, rationalization of stocked parts, and the like by using common parts to a plurality of models of automobiles.

When air cleaners having great influence on the performance of engines are commonly used to a plurality of models of automobiles, however, there arises a problem that a capacity of the air cleaners tend to become insufficient to some engines depending upon the displacement thereof and thus a performance of the engines cannot be sufficiently derived sometimes.

To solve this problem, air cleaners having a larger capacity are supplied in a parts market to cover engines to which the capacity of the commonly used air cleaners is deficient or insufficient even if it is not deficient.

When a capacity of an air cleaner is increased, that is, when a surface area of an filter element is increased in the state, for example, that an outside shape of the filter element is formed to the same as that of an existing filter element, however, a height of the filter element is increased. Thus, a problem arises in that the filter element with the increased height cannot be accommodated in an existing housing or casing in which the existing filter element is accommodated.

Taking the above into consideration, an object of the present invention is to provide an air cleaner for engines which can be accommodated in an existing air cleaner housing or casing even if its height is increased by increasing its capacity by, for example, 50% as compared with that of an existing air cleaner.

SUMMARY OF THE INVENTION

The present invention arranged to solve the above problem is such that a air cleaner for engines has a filter unit formed to a plane shape and including an element and an edge portion of the element composed of a rubber material or the like and formed around the filter unit to keep the shape of the filter unit around the circumference thereof and to support the filter unit in a housing and a casing as a box-shaped vessel dividable into upper and lower portions with an air intake port defined to one of the portions and an air feed port defined to the other of the portion, respectively and holding the edge portion of the element between the divided surfaces of the casing, wherein the filter unit is formed to have a larger volume by increasing the surface area thereof while maintaining its original outside shape as well as the portion to be held of the edge portion formed around the circumference of the filter unit which is to be held between the divided surfaces of the casing is formed to have a larger wall thickness. Further, the present invention may be arranged such that an abutment member is applied to the portion to the held in place of increasing the wall thickness of the portion so as to increase the volume of the portion to be held.

DESCRIPTION OF THE PREFERRED EMBODIMENTS

Figure 1:
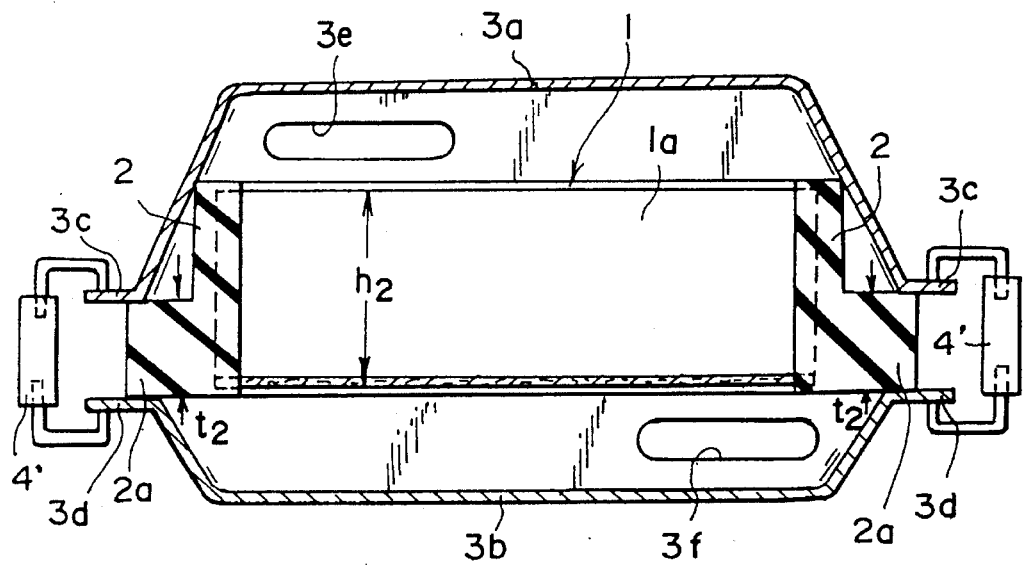
FIG. 1 is a longitudinal cross sectional view schematically showing a main portion of an example of an air cleaner of the present invention.
Figure 2:
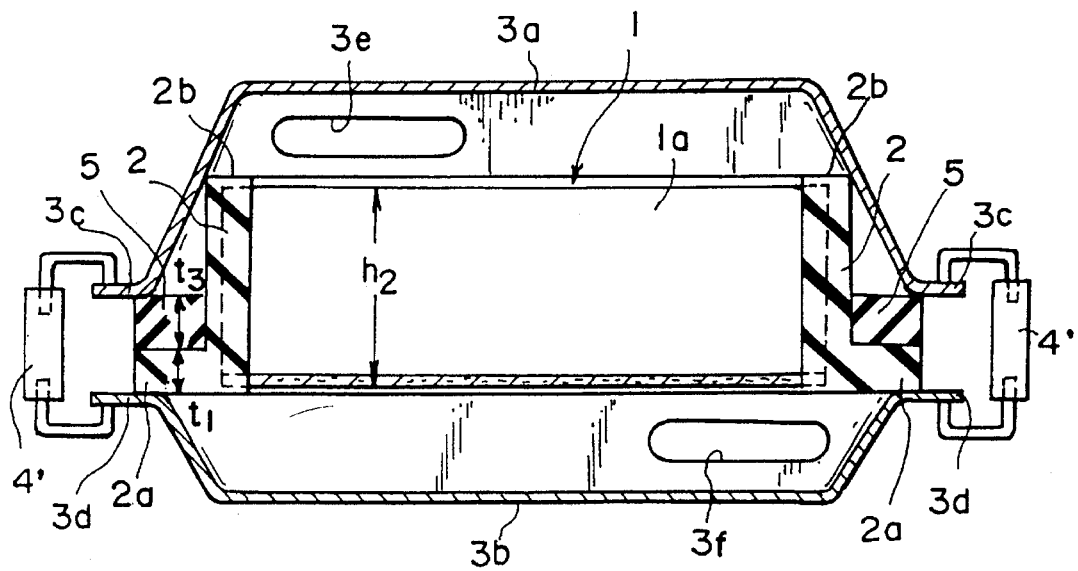
FIG. 2 is a longitudinal cross sectional view of another example of an air cleaner of the present invention.
Figure 3:
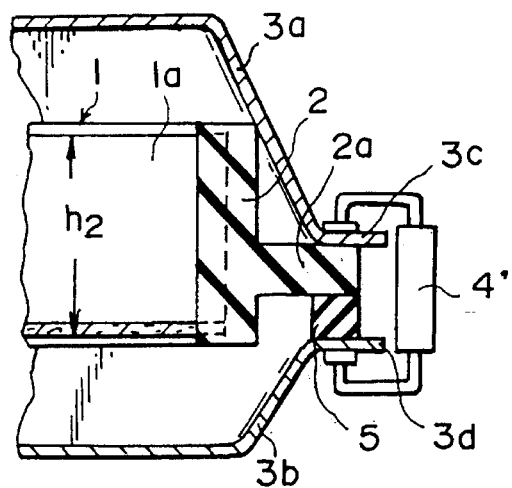
FIG. 3 is a longitudinal cross sectional view of a further example of an air cleaner of the present invention.

Embodiments of an air cleaner of the present invention will be described with reference to the drawings. FIG. 1 is a longitudinal cross sectional view schematically showing a main portion of an example of an air cleaner of the present invention, FIG. 2 is a longitudinal cross sectional view of another example of an air cleaner of the present invention, FIG. 3 is a longitudinal cross sectional view of a further example of an air cleaner of the present invention, and FIG. 4 is a longitudinal cross sectional view schematically showing an existing air cleaner.

Figure 4:
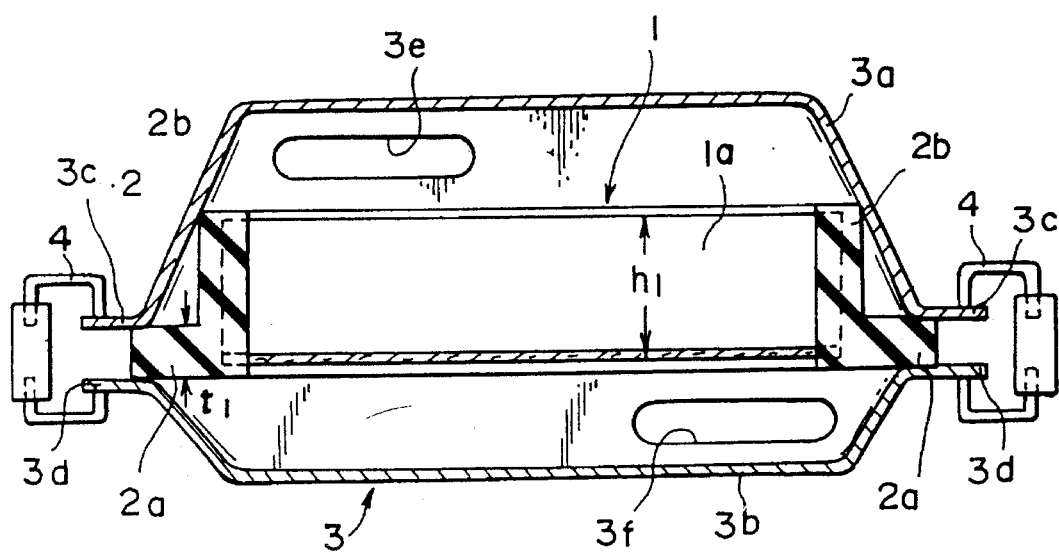
FIG. 4 is a longitudinal cross sectional view schematically showing an existing air cleaner.

FIG. 4 shows an example of a structure of the existing air cleaner disposed in an engine room, wherein numeral 1 denotes a filter element and numeral 2 denotes a circumferential wall having an L-shaped cross section formed around the circumference of the element 1 integrally with it to keep the shape of the element 1 and accommodate the element 1 in and fix the same to a casing 3. A horizontal portion of the circumferential wall is a portion to be held 2a.

The filter element 1 is composed of a sheet-shaped filter member made of nonwoven fabric or the like which is repeatedly bent to form a pleat continuous member 1a having a zigzag cross section so that the filter element 1 has a large surface area. The filter element 1 usually has a rectangular plane shape. The filter element 1 has the circumferential wall 2 formed around the circumference thereof which is formed to substantially the L-shape and has the portion to be held 2a so that the shape of the filter element 1 is kept and the filter element 1 is mounted to the casing 3.

The filter element 1 having the circumferential wall 2 formed around the circumference thereof is held between the divided surfaces 3c, 3d of the casing 3 having a structure divided into two portion, i.e., an upper casing member 3a and a lower casing member 3b through the flange-shaped portion to be held 2a formed around the entire circumference of the circumferential wall 2 of the filter element 1. The divided surfaces 3c, 3d or the abutting surfaces 3c, 3d are tightened by clips 4. Numeral 3e denotes an air intake port defined to the upper casing member 3a, numeral 3f denotes an air feed port defined to the lower casing member 3b, and numeral $t_1$ denotes a wall thickness of the portion to be held 2a.

With the above arrangement, the casing 3 of the air cleaner shown in FIG. 4 is divided into the two portions or the upper portion and the lower portion through the filter element 1. Therefore, external air taken into the upper casing member 3a from the air intake port 3e is filtered through the filter element 1, fed into the lower casing member 3b and further fed into a carburetor from the air feed port 3f.

According to the present invention, a height of the pleat continuous member 1a is increased so as to increase a filtering area of the filter element 1 in the above air cleaner as compared with that of the filter element shown in FIG. 4 and to form the filter element 1 to the same outline as that of the filter element shown in FIG. 4 when the plane surface of the filter element 1 is viewed. When a height of the pleat continuous member 1a of the element 1 is increased, the shoulder part of the edge portion is abutted against the inner surface of the casing 3 and thus the element 1 cannot be accommodated in the casing 3 in the state as it is.

To cope with this problem, according to the present invention, in the circumference wall 2 formed around the circumference of the element 1 having the pleat continuous member 1a whose height $h_1$ is increased to a height $h_2$, the wall thickness $t_1$ of the portion to be held 2a which to be held between the divided surfaces 3c, 3d of the casing 3 is set to a wall thickness $t_2$ larger than $t_1$, as shown in FIG. 1.

With this arrangement, when the portion to be held 2a having the increased wall thickness $t_2$ to be held between the divided surfaces 3b, 3c of the casing 3, an effective internal height formed by the upper and lower casing members 3a, 3b is increased by the difference of the wall thickness of the member to be held 2a which is increased from $t_1$ to $t_2$, as shown in FIG. 1. As a result, the element 1 whose surface area is increased by increasing the height of the pleats 1a from $h_1$ to $h_2$ can be accommodated in the conventionally used casing 3 in the state as it is. Note, clips whose size is made larger than that of the clips shown in FIG. 2 in accordance with an increase of the wall thickness of the portion to be held 2a are used as clips 4' for holding the divided surfaces 3c, 3d from the outside thereof.

Further, according to the present invention, in a circumference wall 2 formed around the circumference of an element 1 including a pleat continuous member 1a having a height $h_2$ higher than the height $h_1$ shown in FIG. 3, a volume increasing abutment member 5 is applied to a member to be held 2a which to be held between divided surfaces 3c, 3d of a casing 3 so as to increase a thickness of the portion to be held 2a in its entirety to which the abutment member 5 is applied, as shown in FIG. 2. The abutment member 5 is formed of a suitable metal, rubber, or plastic material formed to a necessary thickness and has substantially the same shape as the member to be held 2a when the plane surface thereof is viewed. Note, numeral $t_3$ denotes a wall thickness of the abutment member 5.

When the portion to be held 2a whose volume is increased by the abutment member 5 applied thereto is held between the abutment surfaces 3c, 3d of the casing 3, an effective internal height formed by the upper and lower casing members 3a, 3b is increased in accordance with an increase of thickness of the member to be held 2a. As a result, the element 1 whose surface area is increased by increasing the height of the respective pleats 1a from the height $h_1$ of the conventional pleats to the height $h_2$ can be accommodated in the existing casing 3 in the state as it is. Also in this case, clips whose size is made larger than that of the clips shown in FIG. 4 in accordance with an increase of the interval between the abutment faces 3c, 3d are used as clips 4' for holding the divided surfaces 3c, 3d from the outside thereof.

Although the embodiment of FIG. 3 is arranged such that a volume increasing abutment member 5 is applied to the upper surface of a member to be held 2a, the abutment member 5 may be applied to the lower surface of the member to be held 2a as shown in FIG. 3 or to the upper and lower surfaces thereof although not shown in FIG. 3. In these cases, the position of the member to be held 2a in the height direction of pleats 1a is previously changed and adjusted.

As described above, since the air cleaner of the present invention increases a filtering area by increasing a height of pleats without changing a plane shape of a filter element as well as increases a wall thickness of the part of an edge portion to be held by a casing or a volume increasing abutment member is applied to the part of the edge portion to be held by the casing, a capacity of the air cleaner can be increased while using a conventionally used casing without replacing it. As a result, an air cleaner having a capacity corresponding to a displacement of engines can be provided at a low cost to the engines to which an air cleaner having the same capacity has been conventionally applied regardless of the displacement of the engines.

What is claimed is:

1. An air cleaner for an engine having a filter unit with a plane shape and including an element and an edge portion of the element around the filter unit to keep the shape of the filter unit around the circumference thereof and to support the filter unit in a housing, and a casing having upper and lower portions with an air intake port defined to one of the portions and an air feed port defined to the other of the portions, respectively and for holding the edge portion of the element between peripheries of the upper and lower portions of the casing, wherein a volume of the casing for said filter unit is increased so that a surface area of the filter unit may be increased while maintaining its original outside shape by increasing a thickness of said edge portion which is to be held between the peripheries of the upper and lower portions of said casing.

2. An air cleaner for an engine having a filter unit with a plane shape, and a casing with upper and lower portions for holding an edge portion of the filter unit formed around the circumference thereof between peripheral surfaces of the upper and lower portions, and having an air intake port and an air feed port for the filter unit, wherein said filter unit comprises an abutment member for placement between the peripheral surfaces of the upper and lower portions adjacent the edge portion, said abutment member for increasing a volume of the casing, so that a surface area achievable by the filter unit is increased.

3. An air cleaner for engines according to claim 2, wherein said abutment member is formed of any one of a metal member, a rubber member and a plastic member and applied to the upper surface, the lower surface or the upper and lower surfaces of the portion to be abutted over the entire circumference thereof.

4. An air cleaner for an engine comprising:

a casing having upper and lower members with one of said upper and lower members having an air intake means and the other of said upper and lower members having an air feed means;

an internal cavity defined by interior surfaces of said upper and lower members, said internal cavity having a height that is a distance between corresponding points on said interior surfaces of said upper or lower members;

a filter unit having a peripheral flange for holding said filter unit within said internal cavity, said flange for being held between said interior surfaces of said upper and lower members; and an abutment member for increasing said height of said internal cavity, said abutment member being held between one of said interior surfaces and said flange.

5. The air cleaner of claim 4 further comprising another said abutment member for being held between the other of said interior surfaces and said flange.

6. A method for increasing an interior first height of a casing of an air cleaner for an engine to an interior second height higher than the first height so that the casing accommodates an air filter of the second height, the casing having separable upper and lower members, the method comprising the steps of:

providing an air filter with a peripheral flange having a substantially uniform thickness, the flange for being held between the upper and lower members to hold the air filter within the casing; and increasing the thickness of the flange to thereby increase a distance between the upper and lower members so that the first height of the casing is increased to the second height.

7. The method of claim 6 wherein the step of increasing the thickness comprises the step of positioning a sealing spacer between the flange and one of the upper and lower members.

8. The method of claim 6 wherein the step of increasing the thickness comprises the step of positioning sealing spacers between the flange and each of the upper and lower members.

* * * * *